(12) United States Patent
Zhao

(10) Patent No.: US 8,599,331 B2
(45) Date of Patent: Dec. 3, 2013

(54) LIQUID CRYSTAL DISPLAY WITH CONNECTING ASSEMBLY

(75) Inventor: Jiang Zhao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 101 days.

(21) Appl. No.: 13/304,314

(22) Filed: Nov. 24, 2011

(65) Prior Publication Data

US 2013/0063677 A1     Mar. 14, 2013

(30) Foreign Application Priority Data

Sep. 9, 2011     (CN) .......................... 2011 1 0267008

(51) Int. Cl.
*G02F 1/1333*     (2006.01)

(52) U.S. Cl.
USPC ............................................... 349/58; 349/60

(58) Field of Classification Search
USPC ..................................... 349/58, 60
See application file for complete search history.

(56) References Cited

U.S. PATENT DOCUMENTS 5,146,390 A * 9/1992 Wong ............................ 361/825

* cited by examiner

*Primary Examiner* — Mike Qi
(74) *Attorney, Agent, or Firm* — Altis & Wispro Law Group, Inc.

(57) ABSTRACT

A liquid crystal display (LCD) includes a bracket, an LCD panel received in the bracket, and a number of connecting members resiliently sandwiched between the LCD panel and the bracket.

7 Claims, 4 Drawing Sheets

LIQUID CRYSTAL DISPLAY WITH CONNECTING ASSEMBLY

BACKGROUND

1. Technical Field

The present disclosure relates to a liquid crystal display (LCD).

2. Description of Related Art

LCDs are widely used in electronic products, such as televisions and computers, for example. Usually, an LCD includes a bracket, and an LCD panel received in the bracket. A plurality of through holes is often defined in opposite sides of the bracket. A plurality of corresponding screw holes is defined in opposite sides of the LCD panel. Screws are extended through the through holes to be screwed into the corresponding screw holes of the LCD panel. However, since the LCD panel is directly abutted against in the bracket, water ripple may be formed between the screws and the LCD.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
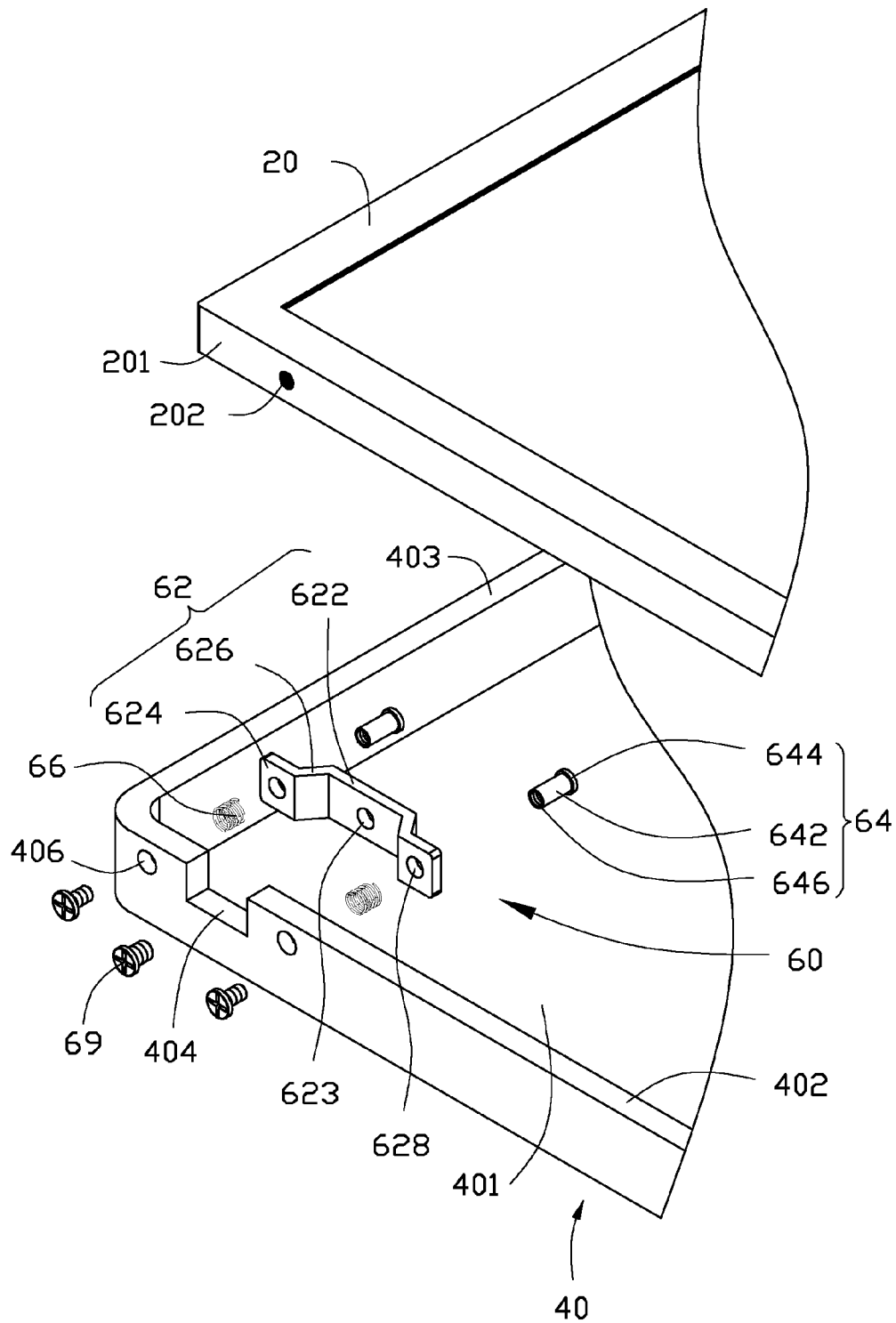
FIG. 1 is a partial, exploded, isometric view of a first exemplary embodiment of a liquid crystal display (LCD).

Referring to FIG. 1, a first exemplary embodiment of a liquid crystal display (LCD) includes an LCD panel 20, a bracket 40, and four connecting assemblies 60.

The LCD panel 20 includes two opposite sidewalls 201. Each of the sidewalls 201 defines two screw holes 202 adjacent to two opposite corners of the LCD panel 20.

The bracket 40 is rectangular, and includes two opposite first side plates 402, and two opposite second side plates 403 perpendicularly connected between corresponding ends of the first side plates 402. The first and second plates 402 and 403 cooperatively bound a receiving space 401. Each of the first side plates 402 defines two cutouts 404 respectively adjacent to the corresponding second side plates 403. Two through holes 406 are defined in the first side plate 402, respectively at two opposite ends of the each cutout 404.

Each connecting assembly 60 includes a connecting member 62, two guiding members 64, two resilient members 66, and three screws 69.

The connecting member 62 includes a fixing plate 622, two sliding plates 624 parallel to the fixing plate 622 and located at two opposite ends of the fixing plate 622, and two connecting plates 626 obliquely connected between the fixing plate 622 and the corresponding sliding plates 624. The fixing plate 622 defines a fixing hole 623. Each sliding plate 624 defines a guiding hole 628.

Each guiding member 64 includes a cylindrical guiding rod 642 and a stopping portion 644 extending out from a first end of the guiding rod 642. A second end of the guiding rod 642 axially defines a screw hole 646, opposite to the stopping portion 644.

In the embodiment, each resilient member 66 is a coil spring.

Figure 2:
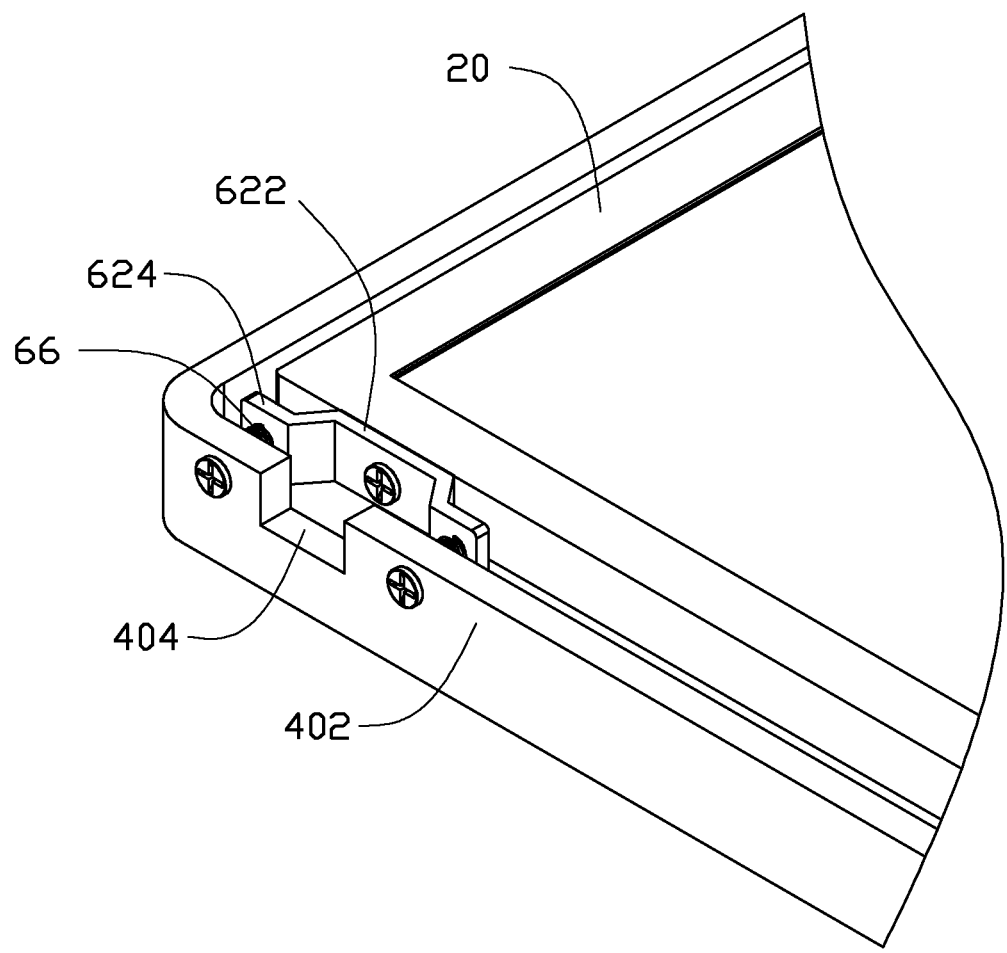
FIG. 2 is an assembled, isometric view of FIG. 1.

Referring to FIG. 2, in assembly, each connecting member 62 is received in the receiving space 401 at a corresponding cutout 404. The guiding rod 642 of each guiding member 64 is inserted into the corresponding guiding hole 628, extending through one of the resilient member 66, and aligning with the corresponding through hole 406 of the bracket 40. Two screws 69 extend through the through holes 406, to be screwed into the corresponding screw holes 646 of the guiding member 64. The resilient members 66 are resiliently sandwiched between the connecting member 62 and the bracket 40. The connecting member 62 is moveable relative to the bracket 40, along the corresponding guiding members 64, and is operable to be blocked by the stopping portions 644. The LCD panel 20 is received in the receiving space 401, among the connecting members 62. The fixing plates 622 resiliently abut against the corresponding sidewalls 201. A screw 69 extends through the fixing hole 623 of each connecting member 62 from the corresponding cutout 404, to be screwed into a corresponding screw hole 202 of the LCD panel 20.

When the LCD shakes, the resilient members 66 can absorb energy of the shaking.

Figure 3:
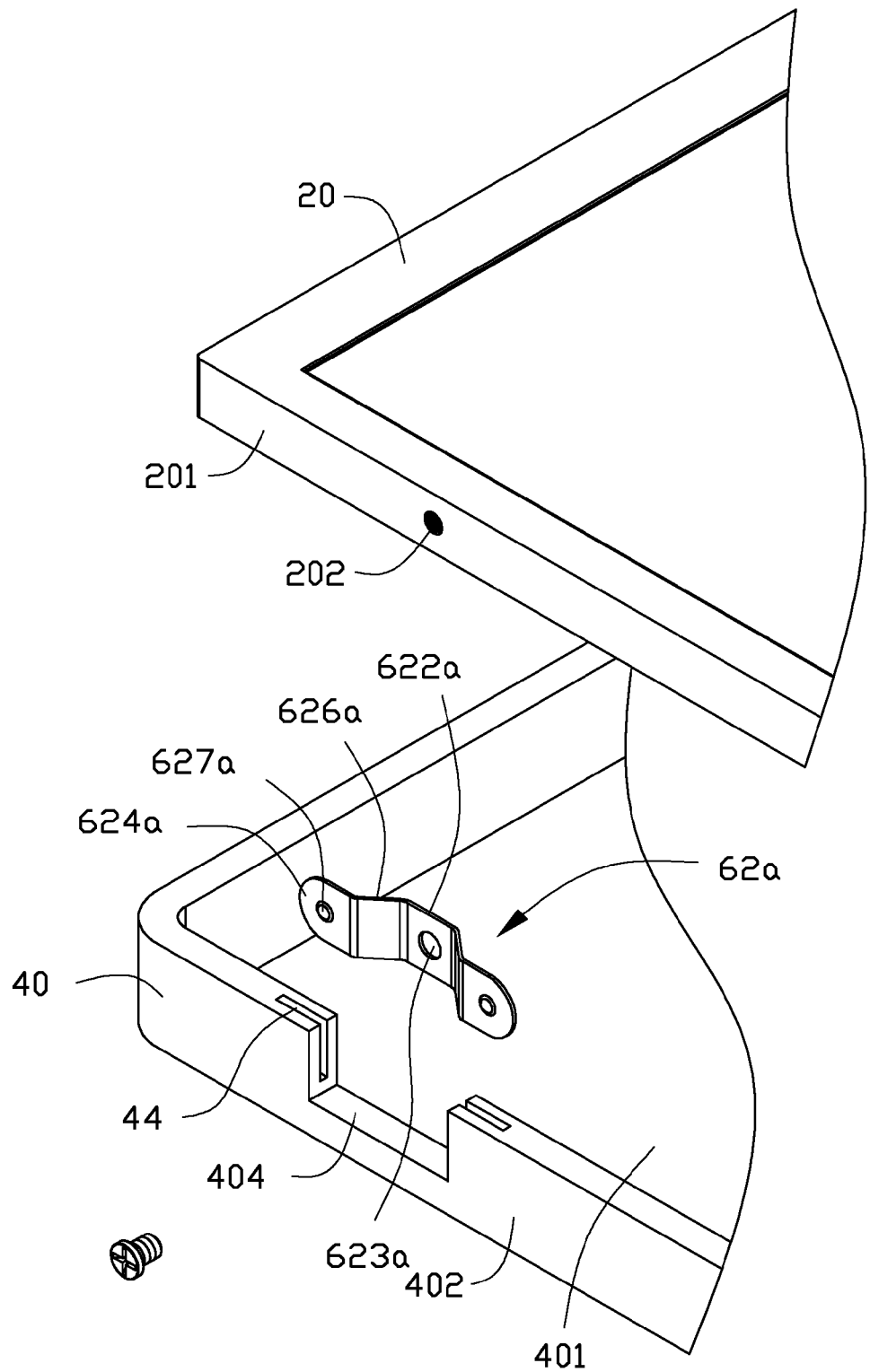
FIG. 3 is a partial, exploded, isometric view of a second exemplary embodiment of an LCD.

Referring to FIG. 3, a second embodiment of an LCD is substantially similar to the first embodiment of the LCD, except that four resilient connecting members 62a replace the connecting assemblies 60 of the first embodiment. In one embodiment, each connecting member 62a is made of a resilient metal plate. The connecting member 62a includes a fixing plate 622a, two latching plates 624a parallel to the fixing plate 622a, located at two opposite ends of the fixing plate 622a, and two resilient connecting plates 626a, obliquely connected between the fixing plate 622a and the corresponding latching plates 624a. The fixing plate 622a defines a fixing hole 623a. A protrusion 627a extends from the latching plate 624a away from the fixing plate 622a. Two installation slots 44 are defined in the first side plate 402 at two opposite ends of each cutout 404. The installation slots 44 extend through a top of the first side plate 402 and communicate with the cutout 404.

Figure 4:
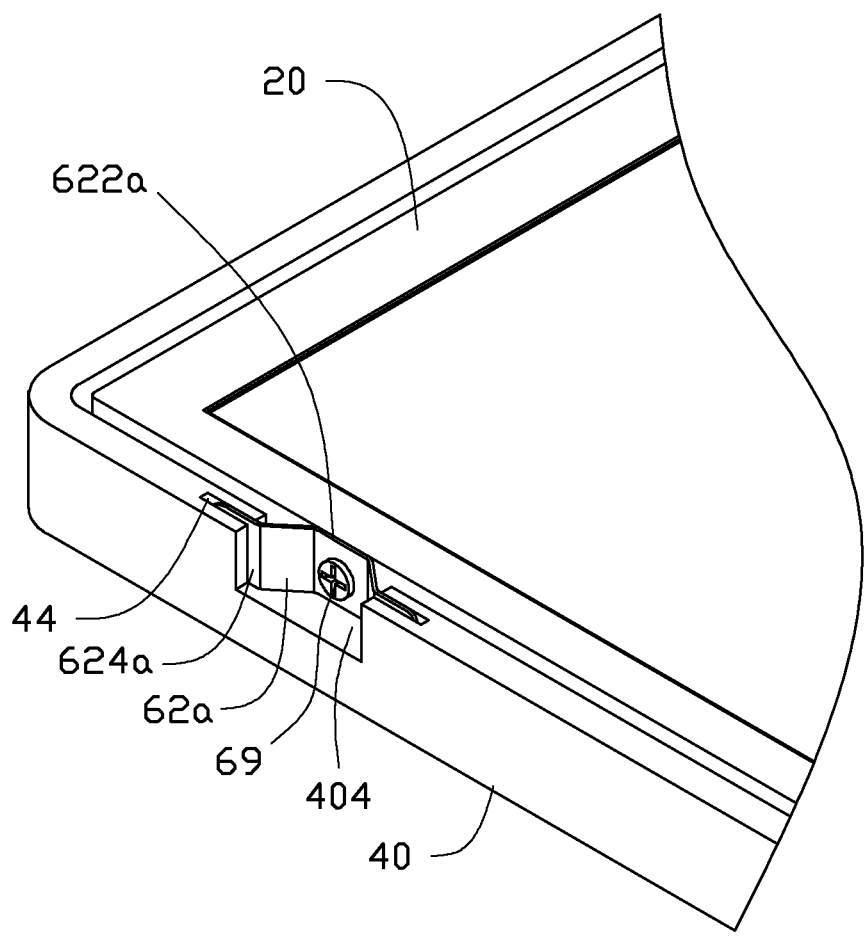
FIG. 4 is an assembled, isometric view of FIG. 3.

Referring to FIG. 4, in assembly, the latching plates 624a are inserted into the corresponding installation slots 44. Each protrusion 627a of the abutting member 62a is slidably engaged in the corresponding installation slot 44. The fixing plate 622a extends into the receiving space 401. The LCD panel 20 is received in the receiving space 401. The fixing plate 622a of each connecting member 62a resiliently abuts against a corresponding sidewall 201 of the LCD panel 20. A screw 69 extends through the fixing hole 623a of each connecting member 62a, to be screwed into a corresponding screw hole 202 of the LCD panel 20.

When the LCD shakes, the connecting members 62a are deformed. The protrusions 627a slide in the corresponding installation slots 44. The connecting members 62a can absorb energy of the shaking.

It is to be understood, however, that even though numerous characteristics and advantages of the embodiments have been set forth in the foregoing description, together with details of the structure and function of the embodiments, the present disclosure is illustrative only, and changes may be made in details, especially in the matters of shape, size, and arrangement of parts within the principles of the embodiments to the full extent indicated by the broad general meaning of the terms in which the appended claims are expressed.

What is claimed is:

1. A liquid crystal display (LCD), comprising:
a bracket;
an LCD panel received in the bracket; and
a plurality of connecting members resiliently sandwiched between the LCD panel and the bracket;
wherein each connecting member comprises a fixing plate fixed to the LCD panel, two opposite sliding plates parallel to the fixing plate and located at two opposite ends of the fixing plate, and two connecting plates connected between the fixing plate and the corresponding sliding plates, the sliding plates is operable to move relative to the bracket.

2. The LCD of claim 1, wherein the fixing plate defines a fixing hole, the LCD panel defines a plurality of screw holes corresponding to the connecting members, a screw extends through the fixing hole of each connecting member and is screwed into the corresponding screw hole.

3. The LCD of claim 1, further comprising a plurality of guiding members and a plurality of resilient members, wherein each sliding plate defines a guiding hole, each guiding member comprises a guiding rod and a stopping portion extending out from a first end of the guiding rod, the guiding rod slidably extends through the guiding hole of a corresponding one of the sliding plates and a corresponding one of the resilient members and is mounted on an inner surface of the bracket, the stopping portion is blocked by the sliding plate opposite to the resilient member.

4. The LCD of claim 3, wherein the bracket comprises two opposite end plates, each end plate defines two through holes for each connecting member, a screw hole is axially defined in a second end of each guiding rod opposite to the stopping portion, two screws extend through the through holes and is screwed into the corresponding screw holes.

5. A liquid crystal display (LCD), comprising:
a bracket;
an LCD panel received in the bracket; and
a plurality of connecting members resiliently sandwiched between the LCD panel and the bracket;
wherein each connecting member comprises a fixing plate fixed to the LCD panel, two latching plates parallel to the fixing plate and located at two opposite ends of the fixing plate, and two resilient connecting plates connected between the fixing plate and the corresponding latching plates, the latching plates are slidably latched to the bracket.

6. The LCD of claim 5, wherein the bracket defines a plurality of cutouts corresponding to the connecting members, two installation slots are defined in the bracket at two opposite ends of each cutout, each installation slot extends through a top of the bracket and communicates with the cutout, the latching plates are slidably inserted into the corresponding installation slots.

7. The LCD of claim 5, wherein a protrusion protrudes from each latching plate for engaging in the corresponding installation slot.

* * * * *